United States Patent [19]

Amerson et al.

[11] Patent Number: 5,475,823
[45] Date of Patent: Dec. 12, 1995

[54] MEMORY PROCESSOR THAT PREVENTS ERRORS WHEN LOAD INSTRUCTIONS ARE MOVED IN THE EXECUTION SEQUENCE

[75] Inventors: Frederic C. Amerson, Santa Clara; Rajiv Gupta, Menlo Park; Vinod K. Kathail, Cupertino; Michael S. Schlansker, Sunnyvale, all of Calif.

[73] Assignee: Hewlett-Packard Company, Palo Alto, Calif.

[21] Appl. No.: 261,647

[22] Filed: Jun. 17, 1994

Related U.S. Application Data

[63] Continuation of Ser. No. 858,389, Mar. 25, 1992, abandoned.

[51] Int. Cl.⁶ .................................................. G06F 9/00
[52] U.S. Cl. ........................ 395/496; 395/800; 395/375; 364/232.8; 364/260.0; 364/262.4; 364/DIG. 1
[58] Field of Search ................................ 395/800, 775, 395/650, 425, 375, 550, 250, 275

[56] References Cited

U.S. PATENT DOCUMENTS

| | | | |
|---|---|---|---|
| 4,928,223 | 5/1990 | Dao et al. | 395/375 |
| 4,942,525 | 7/1990 | Shintani et al. | 395/375 |
| 5,072,364 | 12/1991 | Jaidine et al. | 395/375 |
| 5,095,426 | 3/1992 | Senta | 395/375 |
| 5,101,341 | 3/1992 | Circello et al. | 395/375 |
| 5,121,488 | 6/1992 | Ngai | 395/375 |
| 5,201,057 | 4/1993 | Uht | 395/800 |
| 5,233,694 | 8/1993 | Hoth et al. | 395/375 |

FOREIGN PATENT DOCUMENTS

| | | |
|---|---|---|
| 0054243 | 6/1982 | European Pat. Off. |
| 0433864A2 | 6/1991 | European Pat. Off. |
| 1273339 | 5/1972 | Germany |

OTHER PUBLICATIONS

Polychronopoulos, Constantine D., "Compiler Optimizations for Enhancing Parallelism and Their Impact on Architecture Design", IEEE Transactions on Computer, vol. 37, No. 8, Aug. 1988, pp. 991–1004.

Primary Examiner—Alyssa H. Bowler
Assistant Examiner—Alpesh M. Shah

[57] ABSTRACT

A memory processor which prevents errors when the compiler advances long latency load instructions in the instruction sequence to reduce the loss of efficiency resulting from the latency time. The memory processor intercepts all load and store instructions prior to the instructions entering the memory pipeline. The memory processor stores load instructions for a period of time sufficient to determine if any subsequent store instruction that would have been executed prior to the load instruction, had the load instruction not been moved, references the same address as that specified in the load instruction. If a store instruction references the load instruction address, the invention returns the same data as the load instruction would have if it was not moved by the compiler.

9 Claims, 6 Drawing Sheets

MEMORY PROCESSOR THAT PREVENTS ERRORS WHEN LOAD INSTRUCTIONS ARE MOVED IN THE EXECUTION SEQUENCE

CROSS REFERENCE TO RELATED APPLICATION

This is a continuation of application Ser. No. 07/858,389 filed on Mar. 25, 1992, now abandoned.

FIELD OF THE INVENTION

The present invention relates to computer memory systems, and more particularly to memory systems having long latency times.

BACKGROUND OF THE INVENTION

Conventional computer systems utilize memory systems that provide data to the central processing unit (CPU) in response to load instructions and store data into the memory systems in response to store instructions. The latency time of the memory system is defined to be the number of cycles after the initiation of the load operation at which the data for the load is returned from the memory and is available for use. In many cases the latency of load instructions is critical to the efficiency of the program being executed by the system. One method for avoiding this inefficiency is to issue the load instruction sufficiently before the need for the data to allow the memory time to retrieve the data and have it ready when needed.

The manner in which aggressive: loading of data from the memory system can reduce program execution time can be more easily understood with reference to the following simple computer program.

R1=(A1)

(A2)=52

(A3)=64

R2=(A4)

R3=R2+2

Here, memory addresses are shown with () and registers are denoted by Rn.

It will be assumed that the latencies of the add and memory store operations are 1 cycle each, and the latency of the memory load operation is 3 cycles. If the operations are executed in the order implied in the program, then the program will require 7 cycles to execute. The 7 cycles are as follows:

lead from (A1) into R1 store 52 into (A2)

store 64 into (A3)

load from (A4) into R2 stall stall add 2 to R2 and store into R3

The two "stall" instructions are needed to allow the memory system time to finish the load operation before using the value of R2 in the last instruction.

However, if the load instruction for loading into R2 is initiated before the instructions for storing into (A2) and (A3), the program requires only the following 5 cycles:

load from (A1) into R1 load from (A4) into R2 store 52 into (A2)

store 64 into (A3)

add 2 to R2 and store into R3

Issuing a long latency load instruction early, however, is not always possible because of store instructions that precede the load instruction. This problem can be more easily understood with reference to the following program:

load from (A1) into R1 store 52 into (A2)

store 64 into (A3)

load from (A3) into R2 add 2 to R2 and store in R3

The normal execution of this program would be as follows:

load from (A1) into R1 store 52 into (A2)

store 64 into (A3)

load from (A3) into R2 stall stall add 2 to R2 and store in R3

If the compiler were to move the instruction loading into R2 up two instructions, the following code would be generated load from (A1) into R1 load from (A3) into R2 store 52 into (A2)

store 64 into (A3)

add 2 to R2 and store in R3

This code will not execute the program correctly since there is an instruction storing into memory location (A3) that will now be executed after the load from (A3); whereas, in the original program, the store into (A3) would be executed before the load from (A3). The load from (A3) in the original program would return the value 64, i.e., the stored into (A3) by the previous store instruction; whereas, the load from (A3) in the modified program will return the contents of (A3) prior to the modification of memory location (A3) by the store into (A3).

In the simple example given above, the compiler could, in principle, detect the problem and forego the early issuance of the load instruction. Unfortunately, most programs use indirect referencing schemes that make such an approach impractical. Hence, compilers must generate conservative code that does not take advantage of the early issuance of load instructions having long latencies.

Broadly, it is the object of the present invention to provide a computer memory system that allows the compiler to issue long latency load instructions early.

It is a further object of the present invention to provide a memory system in which long latency load instructions can be issued early even in systems in which indirect addressing is utilized.

These and other objects of the present invention will become apparent to those skilled in the art from the following detailed description of the present invention and the accompanying drawings.

SUMMARY OF THE INVENTION

The present invention comprises a memory processor for preventing a load instruction that has been moved in a code sequence from returning erroneous results because of a subsequent store operation to the memory location specified in said load instruction. The memory processor is normally part of a system including a memory and computing processor in which the memory processor stores and loads data from the memory in response to store and load instructions communicated from the computing processor to the memory. The invention receives store and load instructions intended for the memory. Each store instruction references a store address and each load instruction includes a load address. A watch window is defined for each load instruction. If a store instruction referencing a load address is detected during the watch window, action is taken by the present invention to assure that erroneous data is not delivered to the computing processor. The invention includes a register file for storing the received load instructions.

In one embodiment of the invention, the register file includes counters for counting the number of instruction cycles each received instruction has been stored therein and a flag corresponding to each stored load. Each flag has one of two states, the flag being set to the first of the two states when load instruction is received. The invention includes a comparator for comparing the store address of each received store instruction with the load address of each stored load instruction and for setting said flag corresponding to the load instruction to the second of the two states if said load address matches said store address. The invention includes a controller for determining if one of the stored load instructions has been stored for a predetermined number of instruction cycles. If such a load instruction exists, the controller generates signals specifying the load instruction if said flag corresponding to the load instruction is set to said second state. The regenerated load instruction is then inserted in the instruction sequence as the next instruction to be executed by the memory system to which the present invention is connected.

In another embodiment of the invention, the data that would have been supplied by the memory had the load instruction not been moved is stored in the invention. This data is updated by subsequent store operations referencing the addresses in the register file. If the flag associated with a load instruction indicates that the address specified in the load instruction has been the subject of a subsequent store operation, the updated data is sent to the processor in place of the data that would have been generated by the load instruction in question.

DETAILED DESCRIPTION OF THE INVENTION

Figure 1:
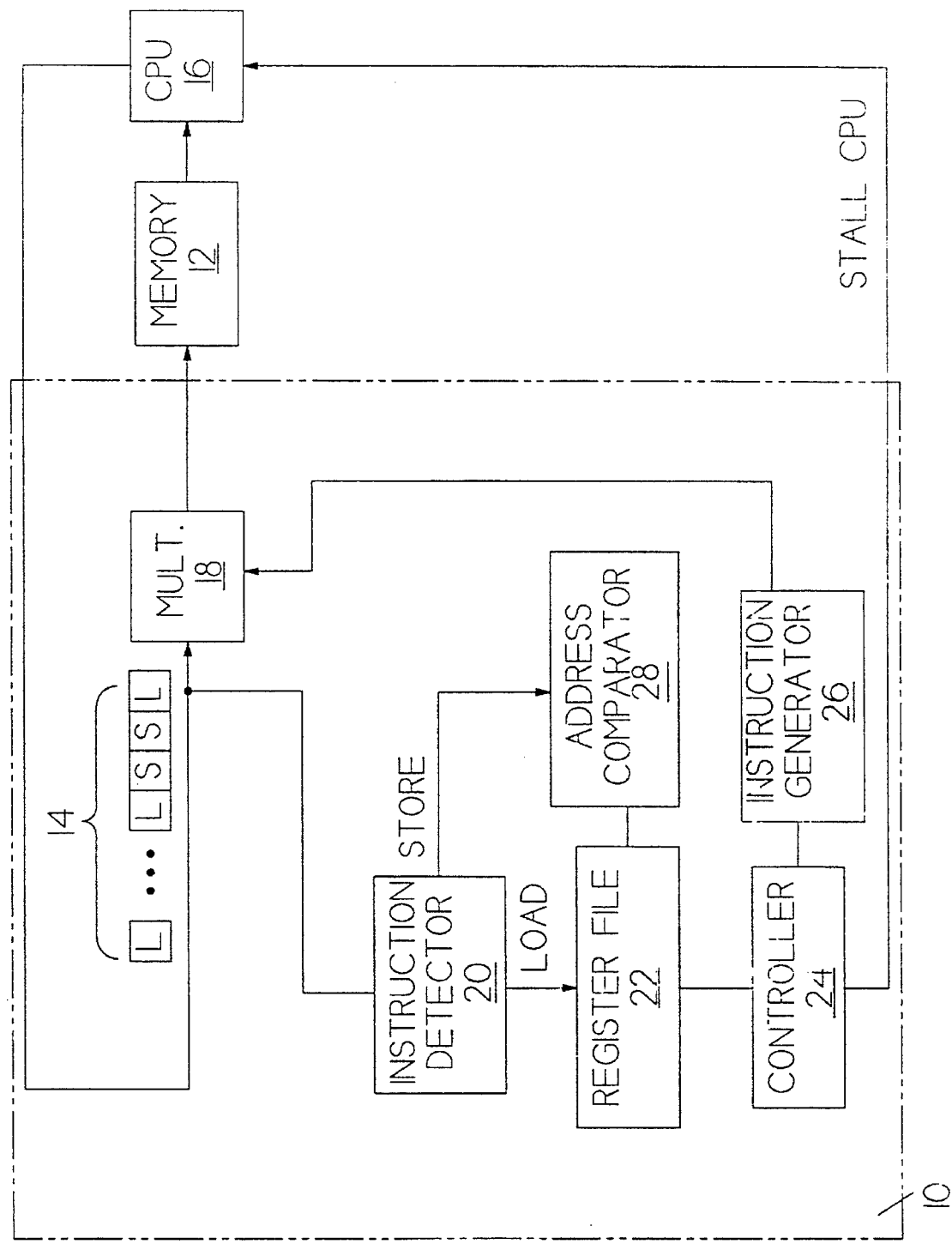
FIG. 1 is a block diagram of one embodiment of a memory system according to the present invention.

The present invention effectively separates the time when the address (and other parameters) of a load instruction is presented to a memory and the time at which the load instruction effectively samples the state of the memory. In prior art systems, the time that the address of a load instruction is presented to the memory is also the time that the load effectively samples the state of the memory. This is also the time that the load is said to be "executed". Even in pipelined memory systems in which load instructions physically sample the state of the memory a number of cycles after the load instruction is issued, the memory is effectively sampled at the instant that the load is issued because the data returned by the load captures all those memory state modification perpetrated by operations issued before the load. This is true even if these operations have not physically updated the memory by the time the load is issued.

Often, the address of the load can be provided early, but the memory can be effectively sampled only after all operations that precede the load and that potentially modify the data returned by the load have been issued. To prevent subsequent store operations from resulting in erroneous data being returned, prior art systems require a tight coupling between the issuance of the load instruction and the time at which the state of the memory is sampled. As a result, the latency times of the load instructions cannot be masked by early issuance of the load instructions. The present invention breaks the coupling between the issuance of the load instruction and the time at which the state of the memory is sampled. The present invention utilizes a load instruction which separately defines the time at which the state of the memory is sampled relative to the time at which the load instruction is issued.

In a computer system utilizing the present invention, the compiler aggressively moves long latency load instructions to an earlier position in the code to avoid the delays that would otherwise be produced by the long latency times. The present invention detects those load instructions for which the move could result in erroneous data being returned by the memory system in response to the o load instruction. When the present invention determines that a moved load instruction could result in erroneous data, the present invention either forwards the correct data to the CPU or causes the CPU to suspend operations and reissues the load instruction at its previous position in the code. This re-executed load instruction will introduce a delay equal to its latency time; hence, the system will execute this instruction in the same time as prior art systems would have executed the instruction. On the other hand, those load instructions for which the move could not result in erroneous data being returned, execute with reduced latency times, thereby increasing the overall efficiency of the program.

When used in conjunction with the present invention, a "watch-window" is defined for each load instruction that is moved by the compiler. In one embodiment of the present invention, the compiler stores a count in each long latency load instruction that indicates the number of instructions over which it was moved with respect to the code ordering implied in the original program. The present invention detects such load instructions as they enter the memory pipeline and stores information specifying the load instruction and the number of instructions over which it was moved. Denote the number of instructions over which the long latency load instruction was moved by N. On each of the following N instruction cycles, the present invention examines the instructions entering the memory pipeline to determine if the instruction in question is a store instruction referencing the same memory location as that specified in the load instruction. If no such store instruction is detected, the load instruction in question will return valid data and no action need be taken. If, however, a store instruction referencing the memory location in question was detected during the N instruction cycles, the present invention causes the long latency load instruction to be re-executed at the location in the code sequence at which it would have been executed without the move. During this re-execution, the present invention signals the CPU to suspend operations for the latency time of the load instruction in question.

The manner in which the present invention performs these functions can be more easily understood with reference to FIG. 1 which is a block diagram of a memory system utilizing one embodiment of a memory processor 10 according to the present invention. The memory system supplies data to a CPU 16. The memory system includes a memory 12 that stores data and instructions for CPU 16 in response to load and store instructions that are indicated by L and S, respectively. Processor 10 includes a multiplexer 18 that determines the source of the instructions entering memory 12. Normally, multiplexer 18 routes the instructions from CPU 16 to memory 12. A typical sequence of instructions from CPU 16 to memory 12 is shown at 14. As each instruction enters multiplexer 18, an instruction detector 20 examines the instruction to determine if the instruction is a load instruction that has been moved or a store instruction. If the instruction is a load instruction that has been moved in the instruction sequence, controller 24 causes information specifying the instruction to be stored in a register file 22. In addition, controller 24 causes a counter associated with each stored load instruction to be initialized with the value of N associated with that load instruction and a flag associated with each load instruction to be set to a first state. The value of N is set by the compiler at the time the compiler moves the instruction and is equal to the number of instructions the load instruction was moved with reference to the original code order. If the instruction is a store instruction, controller 24 causes address comparator 28 to compare the address specified in the store instruction with the address specified in each load instruction stored in register file 22. As will be explained in more detail below, address comparator 28 preferably compares all stored addresses in register file 22 at once to minimize the time needed for this operation. If the address matches the address of any such load instruction, the flag associated with the load instruction in register file 22 is set to a second state.

At the end of each instruction cycle, controller 24 decrements each of the counters in register file 22 and determines if any of the counters now contains the value 0. If a counter now has the value 0, the flag associated with the corresponding load instruction is examined. If the flag is in the second state, controller causes an instruction generator 26 to reconstruct the corresponding load instruction. The reconstructed load instruction is then caused to be the next instruction executed by memory 12. This instruction is routed to memory 12 via multiplexer 18. In addition, controller 24 signals CPU 16 to suspend operations for a time equal to the latency time of the load instruction in question. This causes the load instruction to be executed in the order implied by the original program. The load instruction entry in register file 22 is then removed.

Figure 2:
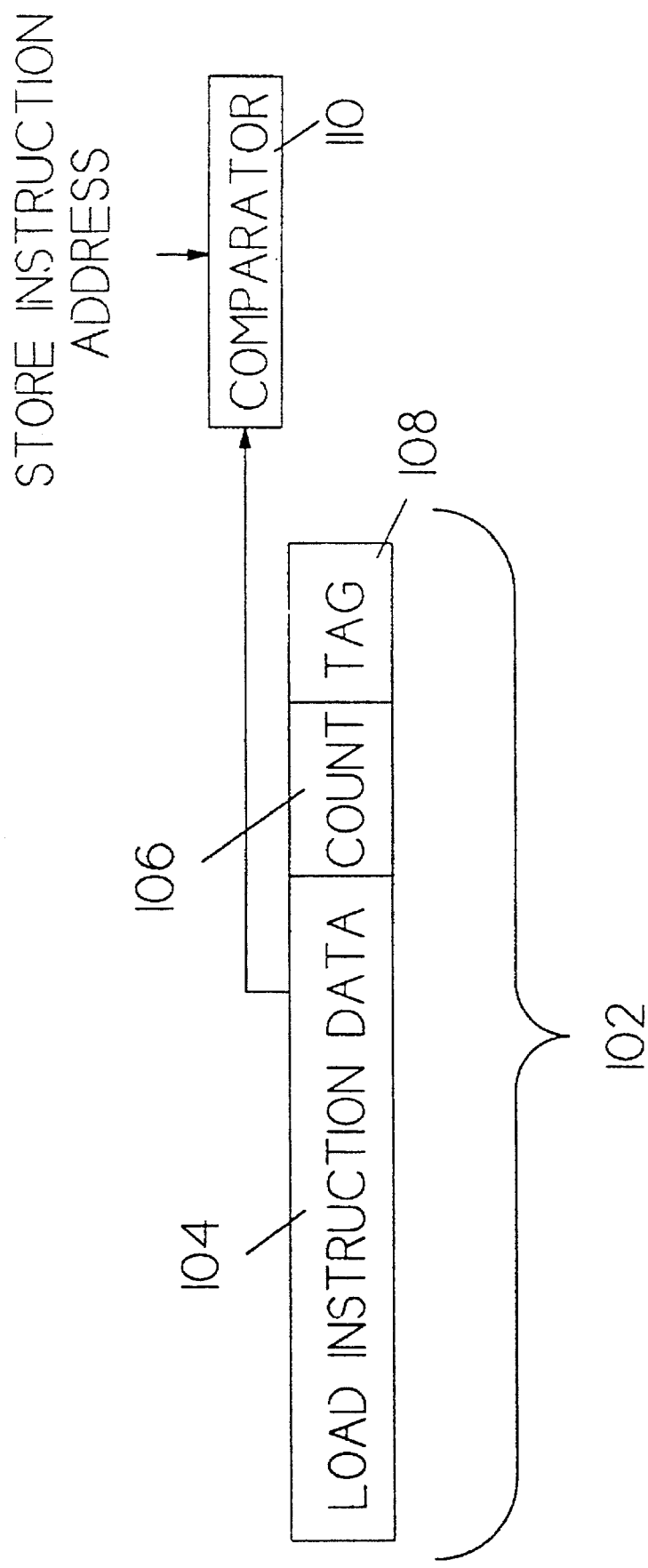
FIG. 2 is a block diagram of a register from the register file shown in FIG. 1.

If the flag in question is still in the first state, the movement of the load instruction could not have resulted in erroneous data being sent to CPU 16. In this case, the load instruction entry in register file 22 is merely removed. FIG. 2 is a block diagram of the preferred embodiment of a register 102 in register file 22. Register 102 includes a storage region 104 for storing information specifying the load instruction stored therein. This information includes the type of load instruction and the address and registers referenced by the load instruction. Register 102 also includes a counter 106 that is loaded with the value of N specified in the load instruction. This counter is decremented on each succeeding instruction cycle. Finally, register 102 includes a flag 108 that is used to mark those load instructions that must be reissued. In the preferred embodiment of the present invention, address comparator 28 includes a comparator 110 corresponding to each register. Comparator 110 compares the address stored in region 104 with the address of a store instruction detected by instruction detector 20. The detected address is communicated to all of the comparators 110 on an internal bus in address comparator 28.

In the embodiment of the present invention described above, the number of instructions that any long latency load instruction is moved is determined by the compiler. It will be apparent to those skilled in the art that the maximum program execution efficiency is obtained when N is equal to the latency time of the long latency load instruction being moved. However, this optimum may not always be obtainable in practice. The size of the register file determines the maximum number of advanced load instructions that can be accommodated at any one time. The compiler must guarantee that no more than this number of load instructions must be stored at any given time. However, to do this, the compiler may be required to forego early execution of a long latency load instruction or use less than the optimum N for the load instruction in question. However, for any given register file size, the present invention still represents a significant improvement over prior art systems.

Figure 3:
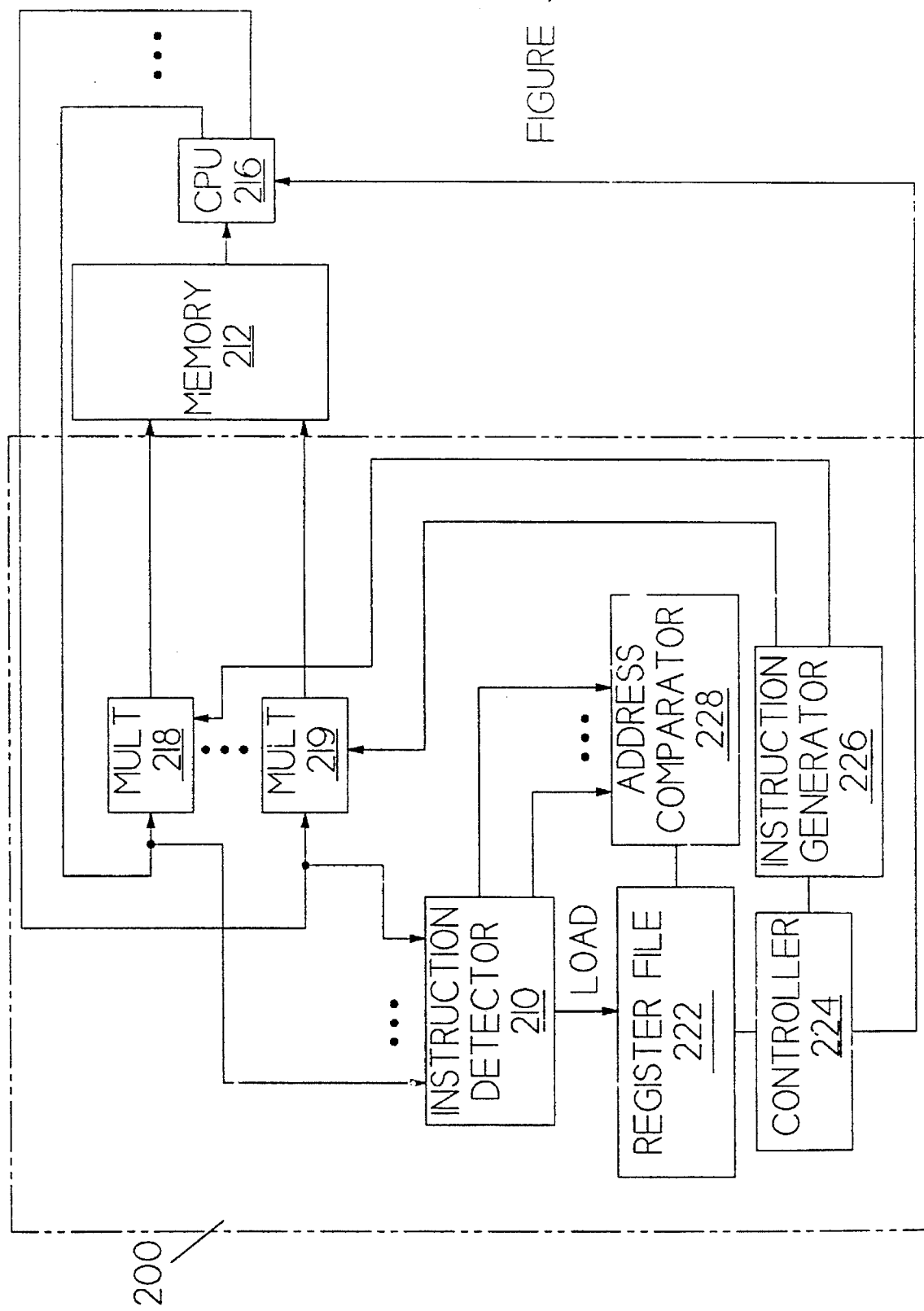
FIG. 3 is a block diagram of a second embodiment of a memory system according to the present invention.

While the above-described embodiments of the present invention have utilized a memory with only one port, other embodiments of the present invention may be utilized with multi-ported memories. Such memories have multiple input ports for receiving load and store instructions. An embodiment of the present invention for use with a multi-ported memory 212 is shown in FIG. 3 at 200. Memory 212 supplies data and instructions to CPU 216. CPU 216 is capable of initiating multiple load and store instructions on each instruction cycle. The instructions in question are inputted to memory 212 on a plurality of ports. Each port includes a multiplexer that inputs instructions to the port in question. Exemplary multiplexers are shown at 218 and 219. Each multiplexer selects the instruction from CPU 216 or an instruction from instruction generator 226.

The instructions from CPU 216 are examined by instruction detector 210. If the instruction is a long latency load instruction that has been moved in the instruction sequence by the compiler, the instruction is input to register file 222 that serves as a function analogous to that of register file 22 shown in FIG. 1. Register file 222 includes a plurality of registers. Each register includes space for four types of data. First, space is provided for storing information specifying the load instruction. Second, space is provided for a counter that is initialized to the count indicating the number of instructions by which the compiler moved the load instruction. Third, space is provided for storing the identity of the port of memory 212 on which the instruction was detected, and fourth, space is provided for a flag to indicate if the load instruction is to be reissued. When the load instruction is stored in register file 222, the flag is set to a first value.

If any of the instructions is a store instruction, address comparator 228 compares the address referenced in the store instruction with the address of the load instructions stored in register file 222. If the address of the store instruction matches that of a load instruction stored in register file 222, the flag associated with that load instruction is set to a second value to indicate that the load instruction should be reissued at the time it would have been issued had the compiler not moved the load instruction in the instruction sequence.

On each instruction cycle, controller 224 causes all of the counters to be decremented by one. Controller 224 then examines each counter to determine if the count stored therein is 0. If the count is 0, controller 224 examines the flag associated with the load instruction to determine if the load instruction is to be reissued. If the flag is set to the second value, controller 224 causes instruction generator 226 to reissue the load instruction. Alternative embodiments may choose to reissue the load instruction on the same port as the instruction was originally inputted to memory 212 or on any ports independent of the port on which the load instruction was originally inputted to memory 212. Controller 224 then signals CPU 216 to suspend operations for a time equal to the latency time of the load instruction in question. Controller 224 then removes any load instructions with a zero counter value from register file 222.

Figure 4:
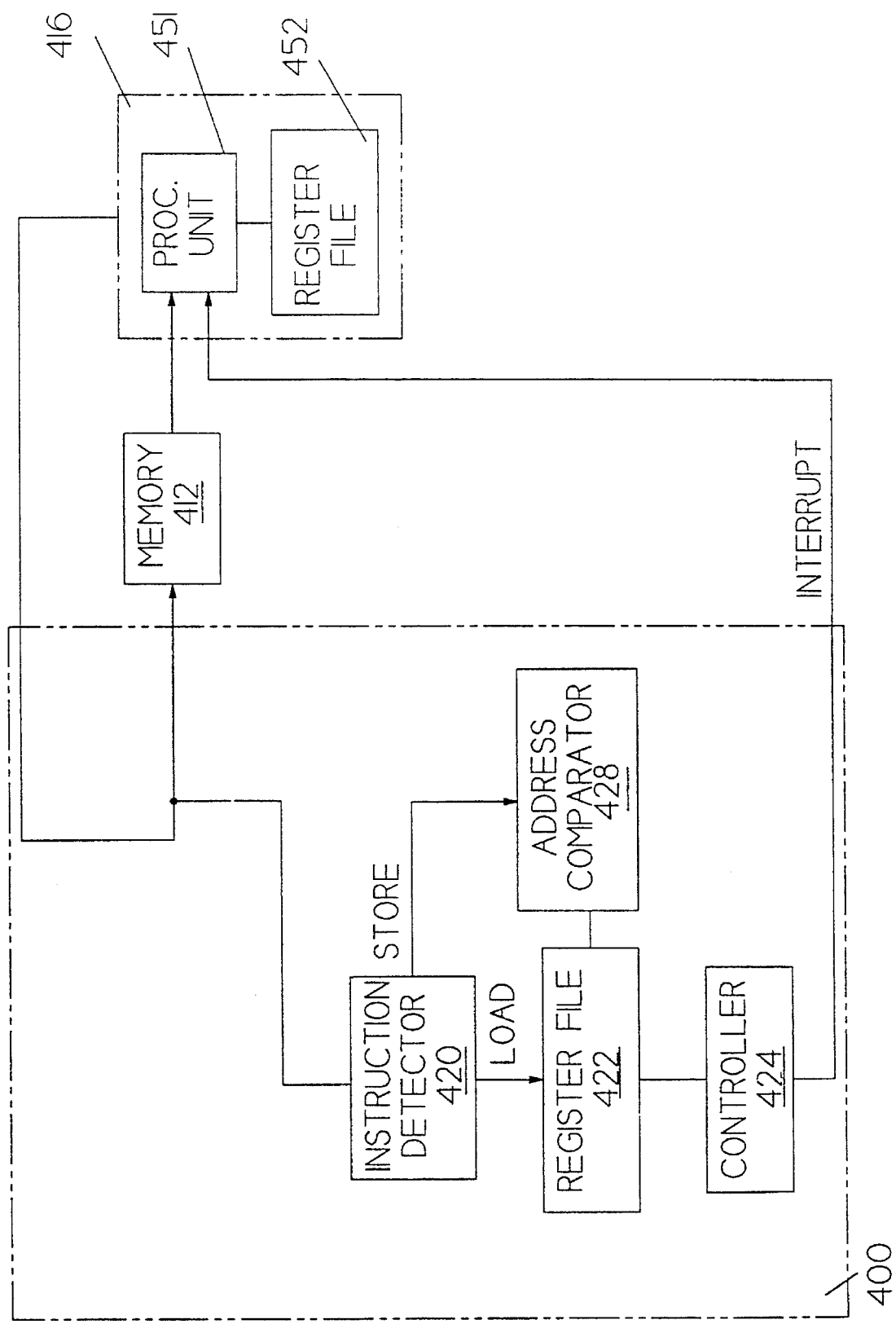
FIG. 4 is a block diagram of a third embodiment of a memory system according to the present invention.

The above-described embodiments to the present invention utilize schemes in which the present invention causes the load instruction to be reissued via a multiplexer such as multiplexer 18 shown in FIG. 1. Such a multiplexer may introduce unacceptable delays in the memory system. An embodiment of the present invention that avoids such a multiplexer is shown in FIG. 4 at 400. Memory processor 400 monitors the instructions sent by CPU 416 to memory 412. The addresses of the load instructions sent by CPU 416 are stored in a register file 452 within CPU 416 for the duration of the latency time of the load instruction in question. The compiler can assure that the contents of a specific register in register file 452 used for storing the address of a load instruction are not overwritten until after the latency period of the load instruction in question. When instruction detector 420 detects a load instruction at the input to memory 412, instruction detector 420 causes the index of the register in register file 452 to be stored in register file 422 as well as the address referenced by the load instruction and a count specifying the length of the "watch window" for the load instruction in question. Each time a store instruction is detected by instruction detector 420, controller 424 causes address comparator 428 to compare the addresses associated with the load instructions stored in register file 422 with the address of the detected store instruction. If the detected store address matches one of the load instruction addresses, the flag associated with the load instruction is set to indicate that the load instruction must be re-issued. At the end of each instruction, all of the counts in register file 422 are decremented to determine if the watch window associated with any load instruction has expired.

If controller 424 determines that a watch window has expired for a load instruction that is to be re-issued, controller 424 issues an interrupt to CPU 416. The interrupt includes the index of the register in register file 452 that contains the address of the load instruction that is to be reissued. The interrupt handling routine then causes CPU 416 to reissue the load instruction and stall for the appropriate number of cycles to allow the load operation to be completed.

In those situations in which the size of register file 422 is a significant factor in the cost of a memory processor according to the present invention, the size of register file 422 may be reduced by storing only a portion of the address referenced by each load instruction. In this embodiment of the present invention, comparator 428 is also reduced in complexity since the number of gates needed to compare all of the addresses in register file 422 with a store address is proportional to the size of the addresses stored in register file 422. Since only a substring of the address is being stored, some of the comparison operation will mistakenly result in the reissuance of a load instruction. While this will reduce the efficiency of the code execution slightly, it will not result in erroneous data being sent to CPU 416. Hence, this scheme provides a method for reducing the hardware cost associated with the present invention while still maintaining most of the benefits associated aggressively executing load instructions.

Figure 5:
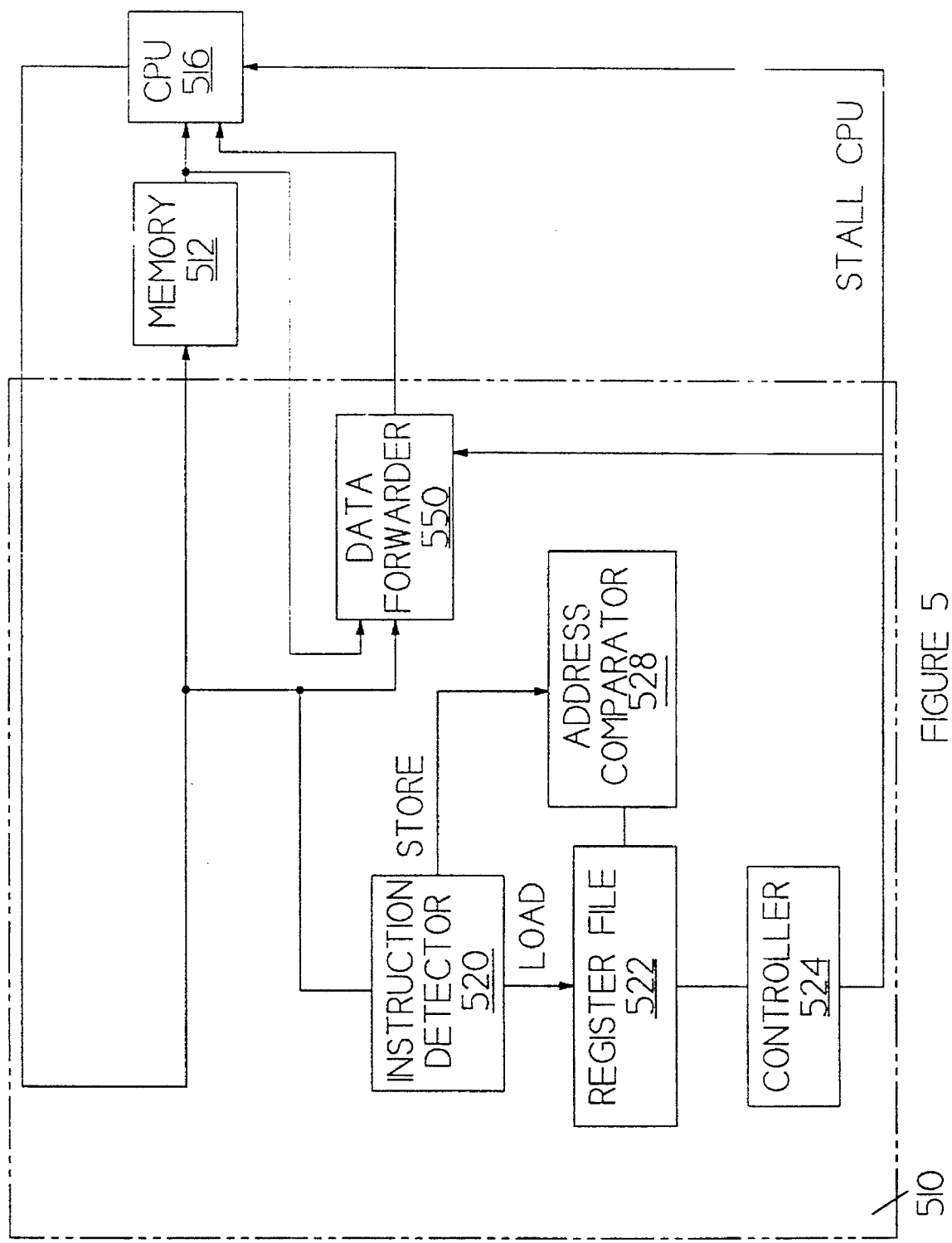
FIG. 5 is a block diagram of a fourth embodiment of a memory system according to the present invention.
Figure 6:
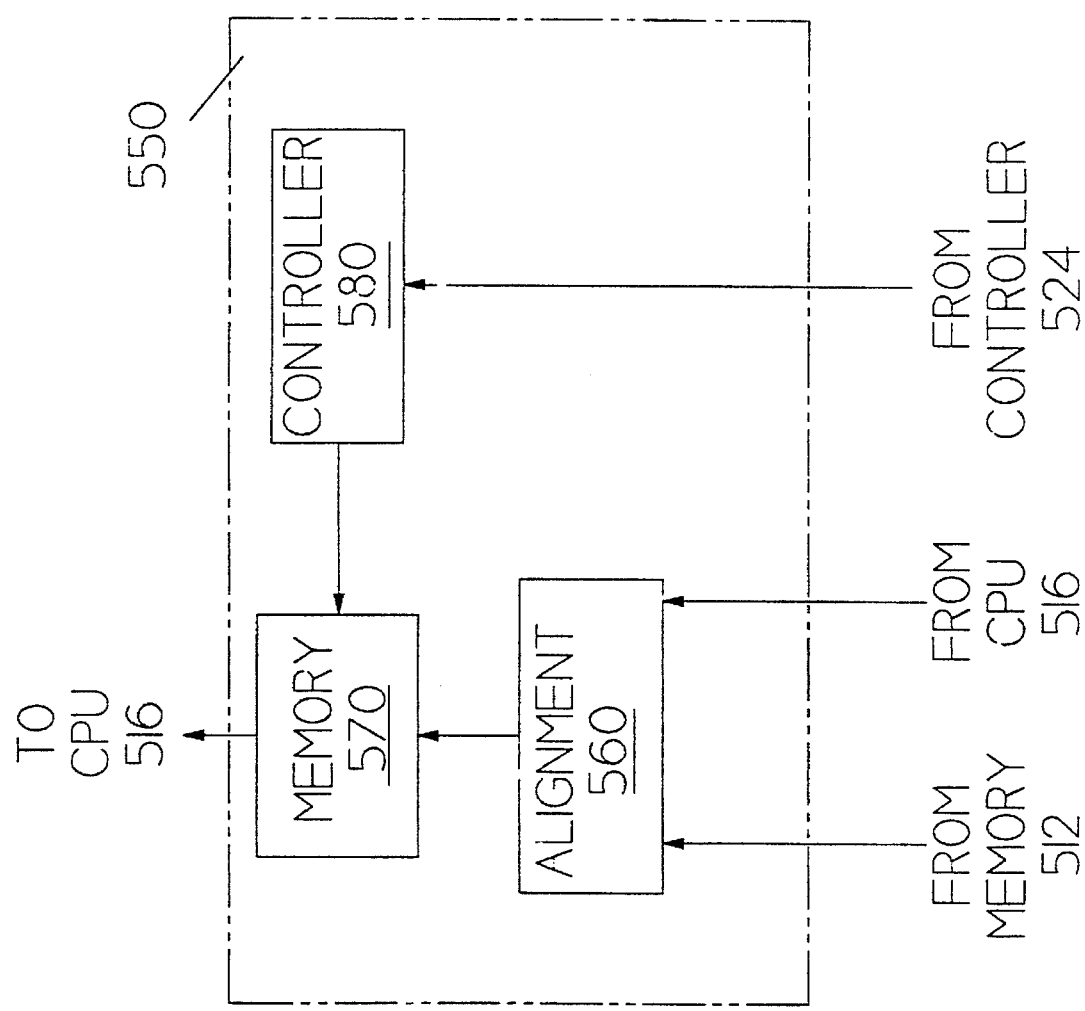
FIG. 6 is a block diagram of a data forwarding circuit according to the present invention.

The embodiments of the present invention described above cause a load instruction whose address has been used in a store instruction during the watch window to be reissued at the point in the code sequence that the load instruction would have been issued had the load instruction not been moved by the compiler. An alternative mechanism for dealing with this situation is to provide a data forwarding system. A block diagram of memory processor 510 according to the present invention which utilizes such a data forwarder is illustrated in FIGS. 5 and 6. As was the case with the previously described embodiments of the present invention, memory processor 510 detects load and store instructions communicated by a CPU 516 to a memory 512. The instructions are detected by instruction detector 520 which recognizes load instructions that have been advanced in the instruction sequence by the compiler. Information specifying the load instruction is logged in a register file 522 as described above with reference to memory processor 10. Information specifying the load instruction addresses is also logged in a data forwarding circuit 550. The load instruction proceeds to query memory 512 and the corresponding memory data is returned to data forwarder 550 at the end of the latency period. The data may also be returned directly to the register file in CPU 516. Address comparator 528 compares the addresses of all store instructions with the addresses of the load instructions stored in register file 522 to check for partial or complete overlap of the memory locations accessed by the load and store instructions. If a store instruction overwrites part or all of the data accessed by the load instruction, controller 524 sets the flag corresponding to the load instruction in question.

When controller 524 determines that the watch window has been completed for a load instruction and the load instruction in question has a flag set to indicate that a store location accessed an address specified in the load instruction, controller 524 causes data forwarder 550 to forward the data to CPU 516. In addition to receiving data specifying the load instructions stored in register file 522, data forwarder 550 also receives any data specified in a store instruction referencing an address specified in a load instruction stored in register file 522. In response to signals from controller 524, data forwarder 550 outputs this data to CPU 516. Data forwarder 550 stores the data in a structure such as that illustrated in FIG. 6. The alignment mechanism 560 and memory mechanism 570 are similar to those found in standard cache structures. As in standard caches, alignment mechanism 560 is used for partial accesses of the stored data. The entries in memory 570 are in one-to-one correspondence with the registers in register file 522.

The internal operations of data forwarder 550 are controlled by controller 580. The address of the load instruction is logged into memory 570 at the same entry location as the corresponding entry in register file 522. Any store operation that references one or more of the entries in register file 522 overwrites the o appropriate bytes in the corresponding entries of memory 570. The data returned by memory 512 to data forwarder 550 writes only into those locations in memory 570 that have not been written by a store operation issued during the watch window. This selective write operation is implemented by maintaining a flag bit for each byte in the entry. The flag bits are initially set to a first value when the load instruction is logged into data forwarder 550. A flag is set to a second state any time a store instruction writes to the byte in question. It should be noted that a store operation may write into more than one byte location in more than one or the storage entries. Data bytes returned from memory 512 are allowed to write only to locations having flags in the first state. Hence, data forwarder 550 always contains the correct data for forwarding to CPU 516 at the end of the watch window.

As noted above, there is a watch window associated with each load. The watch window starts at the time the load instruction is issued, i.e., the time the address is presented to the memory, and terminates at the time the memory state is sampled. If a store instruction issued during the watch window accesses the same memory location, then appropriate action must be taken, i.e., reissue load instruction or forward data from a data forwarding circuit. There are a number of methods for specifying the end of the watch window. The method described above utilizes a count N to define the length of the watch window. In the embodiments described above, the count refers to the number of cycles that must elapse. However, a count that specifies the number of a specified type of instruction, e.g., stores, branches, etc., that must execute may also be utilized. Counting store instruction is especially attractive as it relates directly to how many stores are to be captured. The value of N can be fixed by the hardware or by the compiler. In the first case, all load instructions would have the same watch window. In the later case, the length of the window may be varied on a load by load basis.

There are at least four additional methods for specifying the end of the watch window. First, the end of the watch window may be specified by specifying the address of the instruction whose execution terminates the watch window. The address in question may be either an absolute address or a displacement from the current program counter value. To ensure that the watch window is properly terminated along all execution paths, either the compiler must ensure that the instruction at the specified address is executed along all execution paths, or a second additional termination condition such as that described below o must be implemented.

Second, the use or redefinition of the target register of the load may be used to mark the end of the watch window for that load. Consider a load that loads data from memory into register R2. The memory processor monitors all instructions to the CPU for any instruction using the contents of R2. Such an instruction terminates the watch window.

Third, a separate terminate window instruction may be defined. Such an instruction would terminate the watch window for the instruction specified by a tag associated with the instruction. The tag associated with an aggressive load can be derived in several ways. The compiler can assign a unique number as the tag, the target register number of the aggressive load may be used as the tag, the address of the aggressive load may be used as the tag, or, if the registers in the register file 22 are compiler addressable, then the register number in which the load data is stored may used as the tag. In this last case, the compiler specifies the register in register file 22 into which the data specifying the load instruction is to be entered. The watch window would then be terminated by another load that is logged to the same register.

Finally, the computer architecture may define certain types of instructions that terminate all previously logged load instructions. For example, the watch windows could be terminated on encountering a branch instruction.

There has been described herein a memory system that provides a means for a compiler to issue long latency load instruction in advance to reduce the inefficiencies that would otherwise result from the latency time of the load instruction. Various modifications to the present invention will become apparent to those skilled in the art from the foregoing description and accompanying drawings. Accordingly, the present invention is to be limited solely by the scope of the following claims.

What is claimed is:

1. In a data processing system comprising a processor and memory, said memory comprising means for storing data in response to store instructions from said processor and delivering data to said processor in response to lead instructions from said processor, a memory processor for preventing a lead instruction that has been moved in a code sequence from returning erroneous results because of a store instruction to the memory location specified in said lead instruction, said memory processor comprising:

means for receiving said store and moved load instructions, each said store instruction referencing a store address and including data to be stored at said store address, and each said moved load instruction including a load address, said receiving means including means for detecting said moved load instructions, and for determining a watch window associated with each said moved load instruction;

means connected to said receiving means for storing said received moved load instructions during the execution of other said instructions in said code sequence, said storing means further comprising means for defining said watch window associated with each said moved load instruction and a flag corresponding to each said received moved load instruction stored in said storing means, said flag having one of two states, said flag being set to the first of said two states when moved load instruction is received;

means connected to said receiving means and said storing means for comparing said store address of each received store instruction with the load address of each said moved load instruction stored in said storing means and for setting said flag corresponding to said moved load instruction to the second of said two states if said load address matches said store address; and control means connected to said storing means for determining if the watch window for one of said stored moved load instructions has terminated, said control means further comprising data delivery means for causing the data included in the last said store instruction having a store address matching said load address of said moved load instruction to be outputted to said processing unit if said flag associated with said moved load instruction has been set to said second state.

2. The memory processor of claim 1 wherein said storing means further comprises means for storing a count associated with each said stored moved load instruction and wherein said means for determining if said watch window has terminated comprises counting the number of instruction cycles since said moved load instruction was received and comparing said number to said stored count.

3. The memory processor of claim 1 wherein said means for determining if said watch window has terminated comprises means for detecting an instruction having an address matching the load address in said moved load instruction.

4. The memory processor of claim 1 wherein said means for determining if said watch window has terminated comprises means for detecting an instruction that references a register that is also referenced in said moved load instruction.

5. The memory processor of claim 1 wherein said means for determining if said watch window has terminated comprises means [20,210,420,520] for detecting a predetermined instruction.

6. The memory processor of claim 5 wherein said predetermined instruction includes a tag which matches a corresponding tag associated with said moved load instruction.

7. The memory processor of claim 1 wherein said data delivery means comprises means for causing said moved load instruction to be coupled to said memory and for causing said processor to stall for a time sufficient to allow said moved load instruction to be executed by said memory.

8. The memory processor of claim 1 wherein said data delivery means comprises means coupled to said memory for receiving a store instruction directed to an address specified in any of said moved load instructions stored in said storage means, means for storing the new contents of said memory at said address as specified by said received store instruction, and means for receiving the data generated by said memory in response to each said moved load instruction, and wherein said data delivery means comprises means for outputting either the data generated by said memory or said new contents corresponding to said moved load instruction to said processor depending on the state of said flag corresponding to said moved load instruction.

9. The memory processor of claim 1 wherein said receiving means further comprises means for receiving said store and moved load instructions from a plurality of instruction streams and wherein said storing means further comprises means for storing the identity of the instruction stream from which each stored moved load instruction was received.

* * * * *